Oct. 1, 1968 R. FRIED 3,403,589
AUTOMATICALLY PROGRAMMED PIANO
Filed Oct. 18, 1965 3 Sheets-Sheet 1
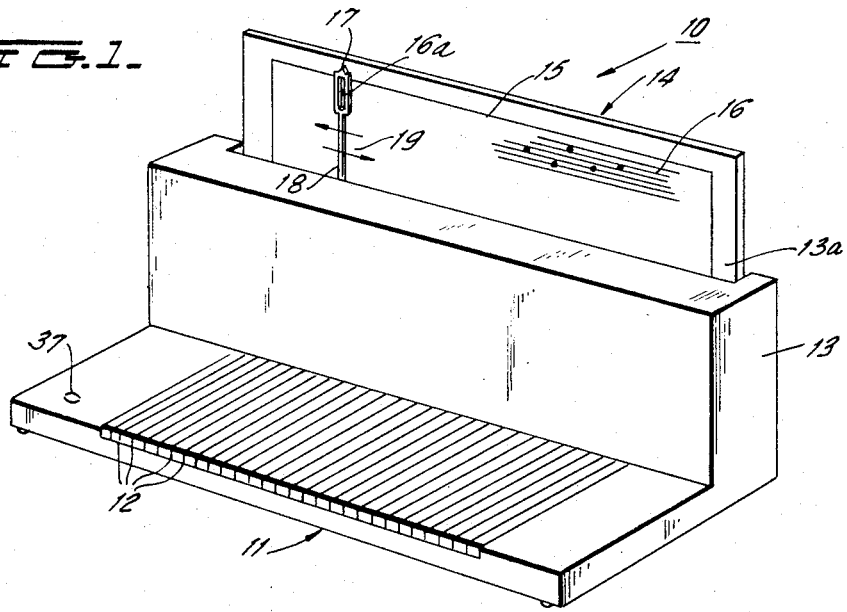
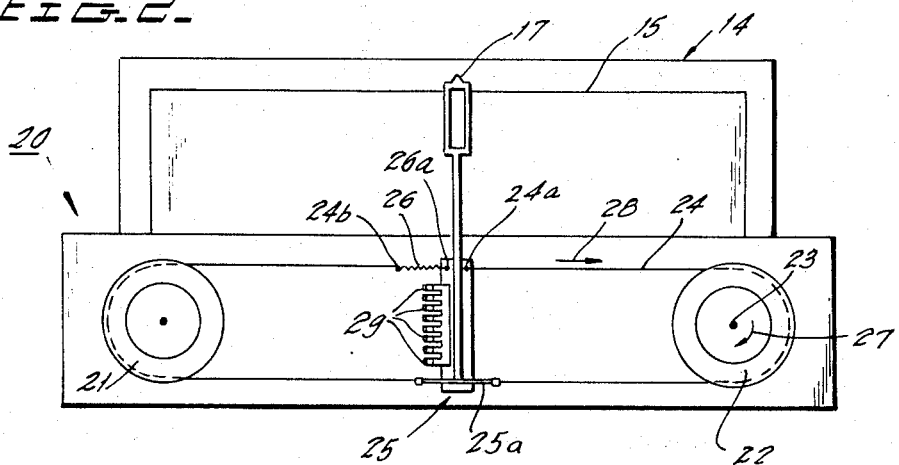
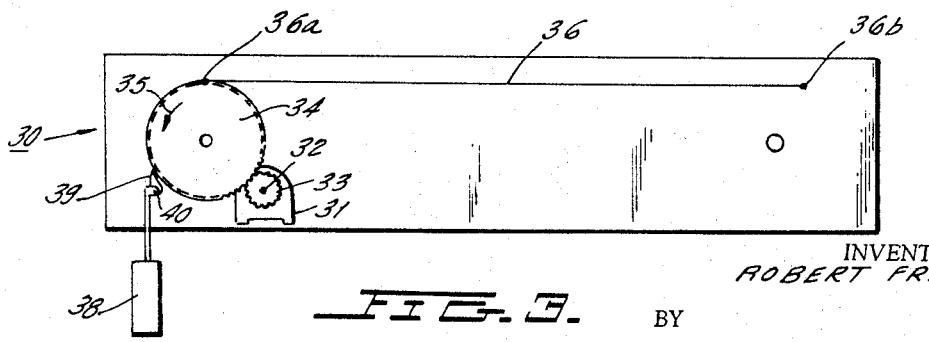
INVENTOR.
ROBERT FRIED
BY
OSTROLENK, FABER, GERB & SOFFEN
ATTORNEYS

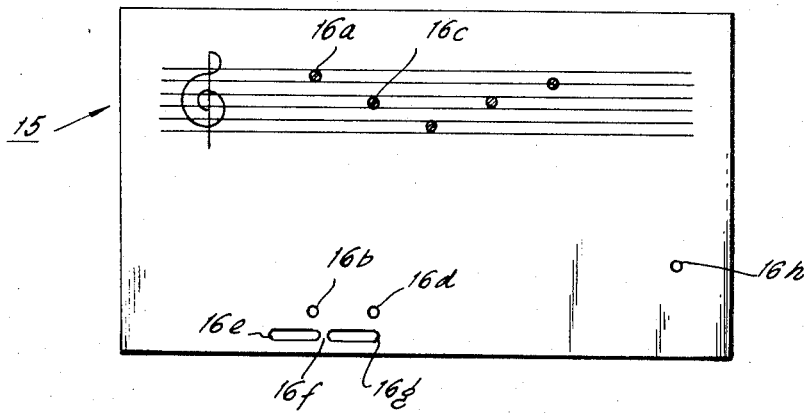
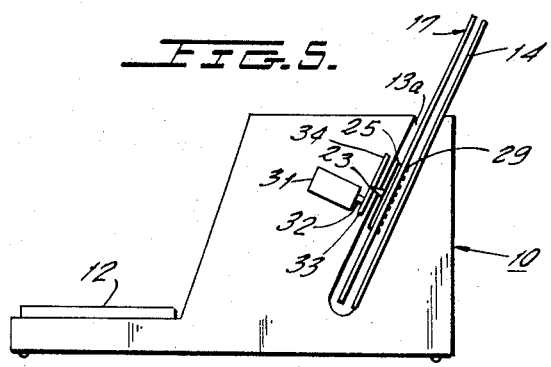
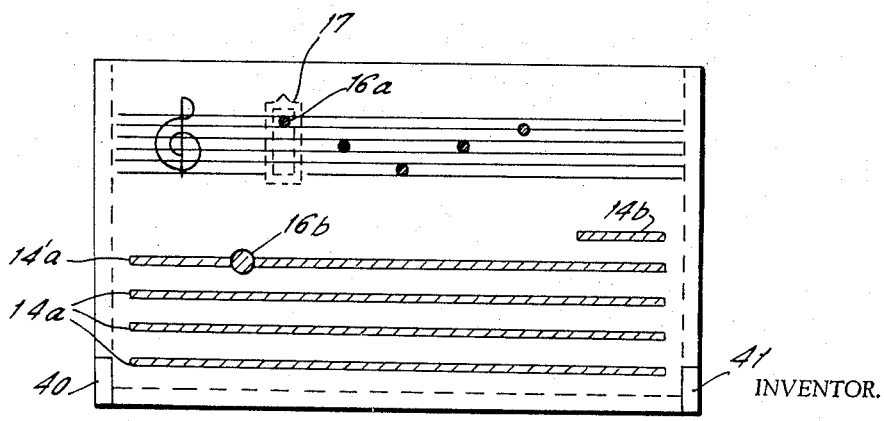

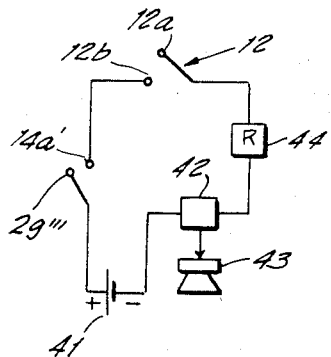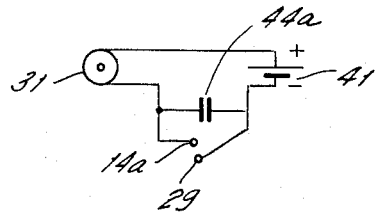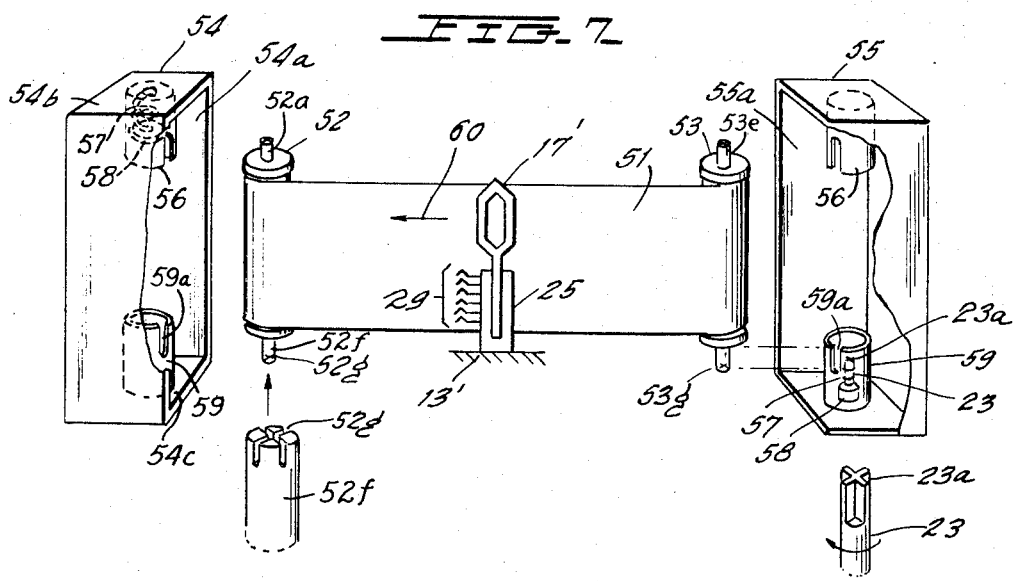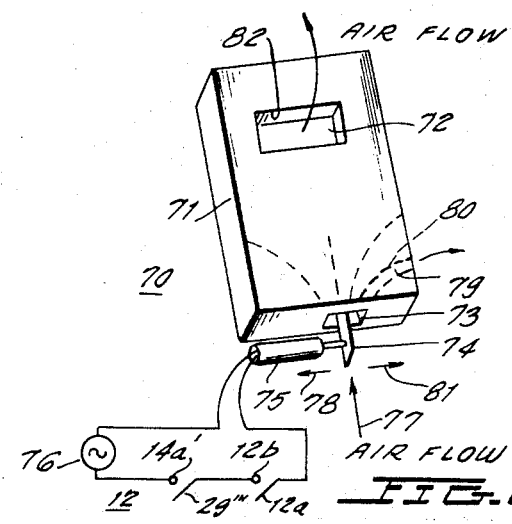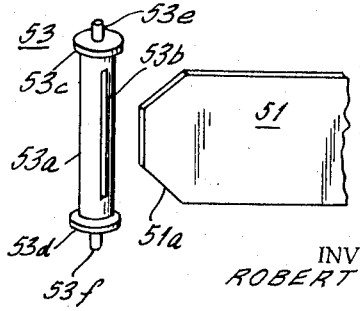

United States Patent Office 3,403,589
Patented Oct. 1, 1968

3,403,589
AUTOMATICALLY PROGRAMMED PIANO
Robert Fried, 52 Herbert Drive,
East Brunswick, N.J. 08816
Filed Oct. 18, 1965, Ser. No. 497,210
11 Claims. (Cl. 84—478)

ABSTRACT OF THE DISCLOSURE

A programmable key-operated musical instrument included a pointer mechanism and a music sheet movable relative to the pointer. The pointer mechanism includes a pointer structure for "framing" one note of the sheet music at any given instant and further includes sensing means for establishing an electrical circuit determined by coded information isomorphically related to each note of the music sheet, which coded information is in the form of punched holes provided at selected locations along the music sheet. The operator selects and depresses one of the keys to actuate the instrument. Only the correct key will actuate the instrument and set up the appropriate circuit for advancing the music sheet to the next note to be played and generating the proper tone. Depression of an incorrect key prevents the music sheet from moving relative to the pointer and prevents any tone from being generated.

---

The instant invention relates to musical instruments and more particularly to keyboard instruments such as, for example, a piano which is so constructed as to provide excellent assistance for instruction of a novice.

The novelty of the instant invention resides in the fact that recent evidence indicates that the learning process is most advantageously affected by immediate positive reinforcement in terms of providing the pupil with such immediate and positive knowledge of his performance. Thus, the immediate information concerning the course of the learning procedure becomes positively reinforcing to the learner.

The basic problem of learning to play the piano without instructional aid is that no satisfactory knowledge of the results of the learning process is provided. The pupil cannot know when he strikes the correct note, when he has in fact done so because there is nothing about the pseudo language of music which is decipherable. There is no obvious relationship between the notes on note paper such as, for example, sheet music and the tones which these notes represent. Thus, just by looking at a music sheet and the note marks on such a sheet, there is no suitable way by which a novice can decode this artificial language.

The purpose of the instant invention described herein is to provide the novice with a means whereby he can learn the meaning of "sheet music," or notes as they are written, by actually playing them, unaided, on the piano apparatus described. It should further be noted that the system developed herein is not restricted to pianos and that the piano is merely one exemplary medium for developing the instant invention.

Conventional approaches have been used to provide an illumination system in which the key corresponding to the note to be played is illuminated to the exclusion of all other keys, providing the pupil with an immediate indication as to which key is to be depressed. This approach has no learning function in that the pupil need not give any considerations as to which note to select the illumination device provides such an indication. Other conventional devices provide an alarm such as an audible alarm and/or a visible alarm to indicate that the improper note has been selected by the pupil. No conventional devices provide a means by which the pupil is prevented from passing on to the next note of the sheet music until the proper note has in fact been selected.

The instant invention is characterized in that it leaves the selection of the note to be played to the student and automatically and electronically prohibits the student from moving to the next note until the correct key has been selected and depressed.

The instant invention is a musical instrument which looks like a piano or an organ and which produces the selected tones by means of a plurality of modular tune circuit oscillators or other suitable means. Each key of the keyboard provided is essentially a two-way switch which, when depressed, energizes an associated tuned oscillator which, in turn, emits a tone of predetermined frequency (pitch). These frequencies or tones (one for each key) correspond to those normally obtained from a similar instrument. Thus, the device of the instant invention is essentially a programmable electronic organ.

The sheet music which the pupil desires to play is mounted upon a suitable backplate having a movable pointer associated therewith. The pointer is provided with a substantially rectangular-shaped frame which identifies the note to be played at any given instant. Sensing means are provided for sensing punched information placed in a second portion of the sheet music which is isomorphically related to the portion of the sheet music containing the notes. The circuitry prevents the incorrect note from being played and prevents the pointer from being moved to the next note to be played so long as an incorrect key is depressed. Upon depression of the one and only correct key the oscillator for the correct note becomes energized and the pointer is then moved to the next note of sheet music. As the pointer reaches the end of its travel, means are provided for resetting the pointer carriage.

It is therefore one object of the instant invention to provide a novel automatically programmed keyboard instrument teaching a novice how to play the instrument.

Another object of the instant invention is to provide a novel automatically programmed keyboard instrument having means for preventing the operator from sounding an incorrect note.

Another object of the instant invention is to provide a novel automatically programmed keyboard musical instrument having means moving relative to the sheet music for identifying the next note to be played.

Another object of the instant invention is to provide a novel automatically programmed keyboard musical instrument having means moving relative to the sheet music for identifying the next note to be played and being further provided with means for preventing the pointer from moving relative to the sheet music until the correct key of the keyboard has been depressed.

Another object of the instant invention is to provide a novel automatically programmed keyboard musical instrument having means movable relative to the sheet music for identifying the next note to be played and being further provided with means for preventing the pointer from moving relative to the sheet music until the correct key of the keyboard has been depressed and being further provided with means for resetting the pointer relative to the sheet music in readiness for receiving new sheet music.

Still another object of the instant invention is to provide a novel automatically programmed keyboard musical instrument having pointer means movable relative to the sheet music for identifying the next note to be played and including sensing means for sensing coded information isomorphically related to the music printed on the sheet to control the selection of the correct note and to control the movement of the pointer relative to the sheet music for indicating the next note to be played.

These and other objects of the instant invention will become apparent when reading the accompanying description and drawings in which:

FIGURE 1 is a perspective view of a keyboard musical instrument designed in accordance with the principles of the instant invention.

FIGURE 2 is an elevational view showing the pointer, sensing means and drive means of the instrument of FIGURE 1 in greater detail.

FIGURE 3 is an elevational rear view showing the driving mechanism for driving the pointer and sensing means of FIGURE 2.

FIGURE 4 is a plan view showing one preferred form of the sheet music which may be employed in the device of FIGURES 1–3.

FIGURE 5 is a side elevational view of the interior of the instrument shown in FIGURE 1 showing relationship between the pointer, sensing means and back plate with the sheet music of FIGURE 4.

FIGURES 6a and 6b are schematic diagrams of the electrical circuits for the device of FIGURES 1–5.

FIGURE 6c shows a plan view of an alternative sheet music embodiment which may be employed in the present invention.

FIGURE 7 is an exploded perspective view of an alternative embodiment for the keyboard actuated musical instrument of FIGURE 1.

FIGURE 7a is a perspective view of one of the spindles employed in the alternative embodiment of FIGURE 7.

FIGURE 8 is a perspective view showing an alternative embodiment for the tuned oscillator circuit of FIGURE 6a.

Referring now to the drawings: FIGURE 1 shows a keyboard actuated musical instrment 10 which generally resembles a small piano or organ in that it has a keyboard 11 having a plurality of individually depressible keys 12. The keyboard 11 may be of a restricted range of pitches or may have the full complement of keys as is found in the organ, piano or other like instrument. The housing 13 of musical instrument 10 positions and supports the depressible keys 12 of keyboard 11 and is provided with an upright section having an elongated opening 13a through which a pressure-mounted back plate 14 protrudes. The sheet of music 15 is placed against the forward surface of back plate 14 so that the upper area containing the musical information 16 is in position to cooperate with automatic pointer 17. Pointer 17 is mounted upon an upright rod 18 which is designed to move in the direction shown by arrows 19 in a manner to be more fully described, causing the open frame pointer 17 to be positioned upon one note 16a of the sheet music. This immediately indicates to the pupil the note which is next to be played. The pupil may then depress one key 12 of keyboard 11 in an attempt to generate the sound which the note 16a positioned beneath frame 17 represents. The sheet music 16 may be considered as a series of vertical bars which contain notes, with each bar containing those notes to be played at a given moment wherein the rhythm and speed signs indicate the moment.

The pupil looks at the note positioned within the pointer framework and depresses any key on the keyboard. Only the key which corresponds to the musical note or notes in the bar will actuate the correct oscillators and produce a tone. Thus, the pupil can never play an incorrect note. The pupil can play only those notes which appear within the frame of pointer 17 and these notes are obviously always the correct notes.

When the pupil has depressed the correct key and that note has been played, pointer 17 moves to the right as shown by lower arrow 19 until it is positioned immediately above the next bar containing notes. The pupil may now look for this note (or these notes) on the keyboard.

FIGURE 2 shows the carriage assembly 20 for pointer 17. The carriage assembly is comprised of first and second rotatably mounted pulley wheels 21 and 22. Pulley wheel 21 is free-riding, while pulley wheel 22 is mounted upon a shaft 23 which is driven by motor means, to be more fully described. A cord 24 is wound about pulleys 21 and 22 and has a first end 24a secured to pointer carriage 25 and a second end 24b secured to a biasing spring 26, the opposite end of which 26a is secured to carriage 25. The lower end of carriage 25 is provided with an elongated member 25a which is hollow so as to receive cord 24 in order to act as a cable guide so as to maintain the carriage 25 and hence the pointer 17 in a vertical position throughout the movement of the carriage and pointer. Spring biasing means 26 acts to keep cord 24 under constant tension.

Rotation of shaft 23, in the direction shown by arrow 27, causes pulley 22 to rotate in this direction, thereby moving the end 24a of cord 24 in the direction shown by arrow 28, causing carriage 25 and pointer 17 to move from left to right. In order to reset pointer 17 rotation may take place in the reverse direction, in a manner to be more fully described.

Carriage 25 has mounted thereto a plurality of sensing fingers 29 which cooperate with conductive backplate 14, shown in FIGURE 1, and the coded information in the sheet music in a manner to be more fully described, in order to set up the appropriate electrical circuits for control of the keyboard instrument. The spring mounted contacts make sliding engagement with the sheet of music 15 which is punched with a plurality of holes along the bottom edge of the sheet in a manner which can best be seen in FIGURE 4. For each note on a line of music, or between lines, there is a hole punched near the bottom portion of the sheet such that the notes and the punched holes are isomorphically related. For example, considering the note 16a which, for the purposes of description, may be an F sharp there is a punched hole 16b provided which cooperates with one of the sensing fingers 29 to establish an electrical path from the sensing finger and through the opening 16b to the conductive backplate 14. The electrical circuit which is conditioned for setting up an electrical path to energize the appropriate tuned oscillator will be more fully described with reference to FIGURE 6a.

The carriage 25 and pointer 17 move to the right each time the correct keyboard key has been depressed. When the pointer 17 comes to the end of its displacement distance, i.e., the distance between adjacent notes, the pupil may then depress another key representative of the note 16c, for example. If the correct key is depressed, the electrical circuit will be completed in a manner to be more fully described, so that this note will be played and the pointer will then be moved on to the next note in succession. The operation of the device of the instant invention can therefore be seen to be analogous to that of a typewriter. The keys 12 of keyboard 11 correspond to predetermined tones with the additional feature that while an incorrect key can be depressed no incorrect tone can be generated.

FIGURE 3 shows the driving mechanism 30 for driving the carriage mount 20 of FIGURE 2. A small motor 31 is provided with a shaft 32 having a gear 33 mounted thereto. The teeth of gear 33 mesh with the teeth of a larger gear 34 which is rigidly secured to shaft 23 shown in FIGURE 2. FIGURE 3 shows a rear view of the driving mechanism 30 so that it should be noted that this shaft 23 is coupled to pulley 22. Counterclockwise rotation, as shown by arrow 35 of gear 34 (which is equivalent to clockwise rotation of pulley 22 when viewing pulley 22 from the front end of the instrument) moves carriage 25 and hence pointer 17 toward the right as shown by arrow 28.

Motor 31 is included within an electrical circuit which includes one of the sensing fingers 29 which lies over the elongated openings 16e in the sheet of music 15 during which period the motor remains energized. As soon as the sensing finger moves to a position 16f between adjacent elongated slots 16e and 16g (see FIGURE 4), the electrical circuit is disrupted, causing motor 31 to become deenergized so that pointer 17 will be positioned above the next note to be played.

When pointer 17 has moved to the extreme right-hand end of the carriage mounting assembly 20, shown in FIGURE 2, the pupil may depress reset button 36 to return pointer 17 and carriage 25 back to the extreme left-hand end of assembly 20. To do this, the gear 34 has secured thereto one end 36a of an elastic spring member 36, the opposite end 36b of which is coupled a spaced distance away from gear 34. As gear 34 rotates counterclockwise (when viewed from the rear of instrument 10) to move pointer 17 from left to right, as shown in FIGURE 1, this causes spring 36 to wind about gear 34 and be placed under tension. When the pointer 17 reaches the end of its travel, i.e., the right-hand end of instrument 10, the instrument may be reset by depressing reset button 37, shown in FIGURE 1. This causes relay 38 to become energized so as to release the ratchet 39 pivotally mounted at 40 from engagement with the teeth of gear 34. Thus, each time the motor 31 drives the gear through a predetermined amount of rotation, ratchet 39 is free to disengage itself from the teeth of gear 34 when the gear is under counterclockwise rotation (when viewed from the rear), however, is prevented by the biased ratchet member 39. The elastic spring 36 being under tension when the movable pointer 17 is at its extreme right-hand end with reference to FIGURE 1, takes over control of rotation of gear 34 upon release of ratchet 39, causing the movable pointer to be reset and returned to its extreme left-hand position relative to FIGURE 1.

In order to control the stoppage of the movable carriage at the extreme right-hand end of the keyboard instrument, the sheet music 15 as shown in FIGURE 4 is provided with an opening 16h near its right-hand end which cooperates with one of the sensing fingers 29 mounted upon movable carriage 25 shown in FIGURE 2 for the purpose of limiting any further travel of the movable carriage toward the right, when the sensing finger is positioned above opening 16h.

FIGURE 5 shows an end view of the instrument of FIGURE 1. As can be seen the back plate 14 protrudes through opening 13a and is provided with a printed circuit configuration shown best in FIGURE 6c, which employs a plurality of elongated strips 14a of conductive material equal in number to the sensing fingers 29 mounted upon carriage 25. When the sensing finger rides upon a hole in the sheet music, an electrical circuit is established through the sensing finger and the conductive strip so as to condition one particular note for the purpose of playing same. As can clearly be seen from FIGURES 1, 5 and 6c, the sheet music is positioned upon the back plate 14 which may, for example, be provided with guide blocks 40 and 41 for properly locating the sheet music so that the coded openings will be positioned immediately above the conductive strips 14a. With the sheet music being appropriately positioned in the manner which can best be seen in FIGURES 1 and 6c, the pointer 17 will "frame" one note at the same time that the isomorphically related coded information for that particular note lies beneath the sensing fingers 29. FIGURE 6a shows one electrical circuit for one particular key 11 of the keyborad, it being understood that there are a plurality of such electrical circuits as shown in FIGURE 6a equal in number to the total number of keys 12 provided on keyboard 11. Let it be assumed that pointer 17 lies above note 16a and that there is an opening 16b provided in the sheet music corresponding to note 16a as can best be seen in FIGURE 6c, with this opening being positioned above conductive strip 14a'. Considering the circuit of FIGURE 6a, terminal 14a' represents the conductive strip. Terminal 29''' represents the sensing finger above this conductive strip. These terminals are in engagement when the pointer 17 is above note 16a. Terminals 12a and 12b represent the terminals for the key 12 shown in FIGURE 6a which become engaged when this key is depressed. Also coupled in this series circuit is a power source 41 and a tuned oscillator 42. When key 12 is depressed this completes the circuit causing the oscillator to become energized and feed its output to a speaker 43. Thus, only upon depression of the correct key will the oscillator 42 become energized.

In order to accompany the playing of the right tone through the selection of the correct key of the keyboard with the movement of the pointer to the next note, it will be noted that the circuit of FIGURE 6a also includes a relay 44. This relay 44 also becomes energized upon selection of the right key so as to operate a pair of normally open contacts 44a. These contacts are connected in a series circuit which is comprised of the contacts 44a, motor 31, and energy source 41, thus energizing the motor to move pointer 17 above the next note to be played. Relay 44 is a slow-to-open type relay, wherein momentary energization of this relay causes the contacts to remain closed for a predetermined time interval. This time interval is of sufficient length so as to allow the sensing finger positioned above the elongated slots 16e and 16g, for example, to ride over the paper portion 16f. As soon as the sensing finger has moved across the paper portion between the elongated slots 16e and 16g, the sensing finger makes contact with one of the conductive strips 14a, for example, so as to establish a conductive path which shunts the contact pair 44a so as to maintain energization of the circuit of FIGURE 6b. As the movable pointer moves toward the right under control of energized motor 31, the conductive path between conductive strip 14a' and sensing finger 29''' is disrupted to energize oscillator 42 and relay 44. This is true even though the keyboard key 12 is maintained in the depressed condition. However, even though relay 44 becomes energized, since it is of the slow-to-open type, energization of the motor 31 continues until the sensing finger 29 makes engagement with a conductive strip 14a through the elongated slot 16g, for example, which energization will continue until the sensing finger moves beyond the right-hand edge of elongated slot 16g. It should be understood that relay contacts 44a will open prior to the sensing finger moving beyond the right-hand edge of elongated slot 16g. Thus, the movable pointer 17 will come to rest immediately above the next note to be played, under automatic control of the electric circuit, shown in FIGURES 6a and 6b.

FIGURES 7 and 7a show an alternative embodiment for the musical keyboard instrument of FIGURES 1, 2 and 5. In this embodiment, instead of employing a single flat sheet of music, an elongated sheet 51 is employed in embodiment 50 with the sheet being wrapped around a delivery spool 53. One typical spool, such as, for example, the spool 53 is shown in FIGURE 7a and is comprised of a rod-like central portion 53a having an elongated slit 53b for receiving the tapered end 51a of music sheet 51. After one or two revolutions of the spool are made with the tapered end 51a jutting through elongated slit 53b, the paper will be firmly secured to spool 53. The disc-shaped ends 53c and 53d act to feed the paper evenly upon the circular-shaped central portion 53a. A pair of projections 53e and 53f are provided at opposite ends of the spool for being received by spool-holding cylinders, shown best in FIGURE 7.

The embodiment 50 of FIGURE 7 is further comprised of a pair of enclosures 54 and 55, each having an open side 54a and 55a, respectively. A portion of the front face of these enclosures has been broken away in order to expose the contents thereof for descriptive purposes. A first cylindrical-shaped member 56 is secured to the under-side of top face 54b in enclosure 54, and has an opening of somewhat greater diameter than the projection 52a of spool 52. A biasing spring 57 has its upper end secured to the top of cylindrical member 56 and has its lower end secured to a solid disc-shaped member 58. The interior surface of bottom side 54c of enclosure 54 is provided with a cylindrical-shaped member 59 having a notch 59a cut along its upper edge. The shaft 23 (previously described) which is driven by motor 31, has its free end facing toward the opening provided in cylinder 59. The free end of shaft 23 is machined so as to have a substantially X-shaped cross-sectional configuration for mating with a substantially X-shaped slot 52g provided in projection 52f, so as to key projection 52f to shaft 23.

Enclosure 55 is provided with substantially the same structure as enclosure 54, with the exception that the shaft 23 of lower cylindrical member 59 is not provided with driving means. In order to mount the sheet music upon the embodiment of FIGURE 7, the delivery spool 53 containing the sheet music is first loaded into enclosure 55 by inserting projection 53e into cylinder 56. The lower projection 53f is then inserted through slot 59a. Biasing spring 57 urges the spool 53 upwardly, causing the disshaped end 53d to rest upon the upper edge of cylindrical member 59. The slot 59a is preferably displaced at a slight angle from an imaginary line drawn between the centers of cylinders 59—59 so as to prevent the spool 53 from being pulled out of position during the operating state.

After having wound the sheet of music about the takeup spool 52 in a manner previously described, the takeup spool may now be positioned within the cylinders 56 and 59 in the same manner as was previously described with respect to delivery spool 53. The only distinction in this operation is that the spool 52 be rotated about its longitudinal axis so as to bring its X-shaped slot 52g into alignment with the X-shaped end 23a of shaft 23.

The remainder of the instrument is substantially the same as that previously described. The main difference lies in the fact that the pointer 17' has its carriage 25 mounted upon a stationary support 13' provided within housing 13 since in the present embodiment the musical scroll 51 moves in the direction shown by arrow 60. Relatively speaking, the operation is the same since the only necessary objective is that the pointer move relative to the sheet of music. The musical scroll 51 is coded in the same manner as the sheet of music 15, shown in FIGURE 4. The sensing fingers 29 cooperate with the coded information in the same manner as previously described. The conductive strips 14a, shown in FIGURE 6c, may, however, be much shorter in length for the embodiment of FIGURE 7 since the sensing fingers 29 always remain stationary.

For both embodiments of FIGURES 1 and 7 the backplate is provided with an extra conductive strip 14b which cooperates with an associated sensing finger 29 for the purpose of indicating when the pointer 17 has moved over the last note of the musical scroll or musical sheet, as the case may be. This may be employed to energize a separate relay for the purpose of automatically rewinding the musical scroll or returning the carriage and pointer back to its starting point, or may be used for the purpose of conditioning a circuit to permit resetting of the device by depression of the reset button 37, shown in FIGURE 1.

An alternative embodiment for the tuned oscillator arrangement of FIGURE 6a is shown in FIGURE 8. In this embodiment 70, which is a type which may be found in conventional organs, there is provided a chamber 71 housing a reed for producing a tone. It should be understood that there are a plurality of such reeds and chambers for each tone to be produced. The chamber 71 is provided with a first opening 73 having a valve member 74 mounted therein. The valve member 74 is operated by a solenoid 75 which comprises one component of a series electrical circuit being further comprised of the switch 12, representing one keyboard circuit, the switch 29''', representing the program, and the A.C. source 76.

A suitable source of airflow may be provided by any blower means (not shown) which is so arranged as to cause the air to flow in the direction shown by arrow 77. The normally deenergized state for solenoid 75 moves the valve member 74 in the direction shown by arrow 78. This causes the airflow to be directed to the right of the valve member 74 thereby entering opening 73 and passing through a channel 79 in chamber 71 and leaving the exit for chamber 79 located at 80.

If the program switch 29''' is closed and the appropriate keyboard switch 12a is closed, source 76 energizes solenoid 75 moving valve member 74 toward the direction shown by arrow 81. This causes the airflow to enter opening 73 and move directly into the interior of chamber 71. The air passes over the reed 72 and out through opening 82, causing the reed to vibrate. It can therefore be seen that the vibrating reed arrangement operates with equal success in the automatically programmed arrangement.

It can be seen from the foregoing description that the instant invention provides a novel keyboard-operated musical instrument which is extremely advantageous for use by a novice desiring to learn how to read music by providing means for preventing the incorrect note from being played and for preventing movement of the pointer device to the next note to be played until the note presently being identified by the pointer is correctly selected by the pupil.

Although there has been described a preferred embodiment of this novel invention, many variations and modifications will now be apparent to those skilled in the art. Therefore, this invention is to be limited, not by the specific disclosure herein, but only by the appending claims.

What is claimed is:
1. An automatically programmed musical instrument comprising:
    a keyboard having a plurality of manually depressible key means;
    a plurality of tone generating means electrically connected to an associated key means;
    a sheet of music having a first portion containing musical information and a second portion containing punch coded information isomorphically related to said musical information;
    carriage means including a pointer for indicating the note to be played;
    a backplate for supporting said sheet of music;
    motor means for moving said carriage means and said sheet of music relative to one another;
    said carriage means further comprising sensing means slidably engageable with said music sheet second portion;
    electrical circuit means coupled to said keyboard means, said tone generating means, said sensing means and said motor means for operating only the appropriate tone generating means related to the note to be played and for advancing the pointer relative to the sheet of music when the correct key means is depressed.

2. The instrument of claim 1 wherein said backplate is further comprised of a plurality of conductive strips positioned beneath said sheet music second portion for conditioning the electrical circuit means when a punched code in said sheet musical is positioned beneath said sensing means.

3. The instrument of claim 1 further comprising reset means for resetting said pointer relative to said sheet music back to the starting point of the musical information.

4. The instrument of claim 1 wherein said sheet music second portion is provided with a plurality of elongated slots arranged at spaced intervals; said sensing means cooperating with said elongated slots for energizing said motor means.

5. The instrument of claim 1 further comprising;
a take-up spool and a delivery spool for securing said music sheet;
first and second means for removably mounting said take-up and delivery spools respectively;
said motor means being coupled to said take-up spool for moving said sheet music relative to said pointer.

6. The instrument of claim 2 wherein said electrical circuit is further comprised of;
slow-to-open relay means being energized simultaneously with the selected one of said tone generating means for energizing said motor means to move said sensing means above the next elongated slot in said music sheet;
said sensing means cooperating with the associated conductive strip for energizing said motor means to move said pointer relative to said sheet of music.

7. The instrument of claim 1 further comprising;
a first rotatably mounted pulley wheel;
a second pulley wheel mounted to be rotatably driven by said motor means;
cord means wound about said first and second pulley wheels being secured to said pointer carriage for moving said carriage relative to said sheet of music upon energization of said motor means.

8. The instrument of claim 3 wherein said reset means is further comprised of spring means coupled to one of said pulley wheels being placed under tension upon rotation of the pulley wheel;
latch means to lock said pulley wheel into position upon deenergization of said motor means;
means for releasing said latch means causing said spring means to rotate said pulley wheel moving said pointer carriage back to its start position.

9. An automatically programmed musical instrument comprising:
a keyboard having a plurality of manually depressible key means;
a plurality of tone generating means each being coupled to an associated key means;
a sheet of music having a first portion containing musical information and a second portion containing punch coded information isomorphically related to said musical information;
carriage means including a pointer for indicating the note to be played;
a backplate for supporting said sheet of music;
motor means for moving said carriage means and said sheet of music relative to one another;
said carriage means further comprising sensing means slidably engageable with said music sheet second portion;
electrical circuit means coupled to said keyboard means, said tone generating means, said sensing means and said motor means for operating only the appropriate tone generating means related to the note to be played and for advancing the pointer relative to the sheet of music when the correct key means is depressed.

10. The instrument of claim 9 wherein each of said tone generating means is comprised of an air operated vibrating reed assembly.

11. The instrument of claim 10 further comprising a source of air pressure;
solenoid operated valve means for directing air from said air source to operate said vibrating reed assembly when the correct key means is depressed.

References Cited

UNITED STATES PATENTS 2,814,230  11/1957  Johnston _____ 84—478

RICHARD B. WILKINSON, *Primary Examiner.*

G. M. POLUMBUS, *Assistant Examiner.*